United States Patent
Janevski

(10) Patent No.: US 7,590,333 B2
(45) Date of Patent: Sep. 15, 2009

(54) IMAGE EXTRACTION FROM VIDEO CONTENT

(75) Inventor: Angel Janevski, New York, NY (US)

(73) Assignee: IPG Electronics 503 Limited, Guernsey (GB)

( * ) Notice: Subject to any disclaimer, the term of this patent is extended or adjusted under 35 U.S.C. 154(b) by 1975 days.

(21) Appl. No.: 09/978,123

(22) Filed: Oct. 15, 2001

(65) Prior Publication Data

US 2003/0072560 A1  Apr. 17, 2003

(51) Int. Cl.
  *H04N 7/26* (2006.01)
(52) U.S. Cl. .................. 386/124; 386/46; 386/110; 386/111; 382/305
(58) Field of Classification Search .............. 386/1, 386/4, 46, 55, 95, 96, 104–107, 117, 124, 386/125; 348/143; 360/13, 32
See application file for complete search history.

(56) References Cited

U.S. PATENT DOCUMENTS 5,901,246 A   5/1999   Hoffberg et al. ............. 382/209
6,928,231 B2*  8/2005   Tajima ........................ 386/46

FOREIGN PATENT DOCUMENTS

| EP | 1124379 A2 | 8/2001 |
| JP | 09-149370 A | 6/1997 |
| JP | 2001-186432 A | 7/2001 |
| JP | 285787 | 10/2001 |

* cited by examiner

*Primary Examiner*—Thai Tran
*Assistant Examiner*—Mishawn Dunn
(74) *Attorney, Agent, or Firm*—Volpe and Koenig PC

(57) ABSTRACT

Image templates define characteristics of video content desired to be recorded, including color characteristics and spatial distribution of regions to be compared in determining a level of similarity and white regions of expected variability which are ignored in the comparison. Each image template is compared to fields for an associated channel, either continuously or during a predefined period. Fields received on the associated channel which have at least a threshold level of similarity are saved, together with associated audio.

21 Claims, 3 Drawing Sheets

IMAGE EXTRACTION FROM VIDEO CONTENT

TECHNICAL FIELD OF THE INVENTION

The present invention is directed, in general, to extraction of selected content from received television broadcasts and, more specifically, to use of templates for image content-based selection of received content to be recorded.

BACKGROUND OF THE INVENTION

Contemporary television broadcast receivers (e.g., televisions, satellite, terrestrial or cable receiver units, set top boxes, and even video cassette recorders and the like) often provide users with the ability to automatically record received content, either to an internal storage device such as a magnetic disk or to an external recording device controlled by the receiver, such as a video cassette recorder (VCR). In addition to recording content received on a specified channel during a specified period, many receivers allow content-based control over recording.

Conventional content-based recording typically relies on peripheral information regarding the content, such as control codes or textual descriptions describing the content, which is embedded within or transmitted in conjunction with the content. Thus, for example, a user might program the receiver to record content identified by predetermined control codes transmitted with the content, or based on the presence of keywords within a textual description associated with the content.

Such mechanisms are limited, however, by the availability of accurate control codes or descriptions with the content. The descriptions associated with content may contain a sufficiently detailed description to allow a user to parse a keyword search which will be successful in identifying relevant matches. Descriptions associated with local news programs, for example, often merely state "News," and advertisements are essentially never described. Moreover, descriptions are typically too general to allow a specific portion of a program to be recorded.

There is, therefore, a need in the art for strictly content-based identification of content to be recorded, without relying solely on peripheral information associated with the content.

SUMMARY OF THE INVENTION

To address the above-discussed deficiencies of the prior art, it is a primary object of the present invention to provide, for use in a video receiver, image templates which define characteristics of video content desired to be recorded, including color characteristics and spatial distribution of regions to be compared in determining a level of similarity and white regions of expected variability which are ignored in the comparison. Each image template is compared to fields for an associated channel, either continuously or during a predefined period. Fields received on the associated channel which have at least a threshold level of similarity are saved, together with associated audio.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

Figure 1:
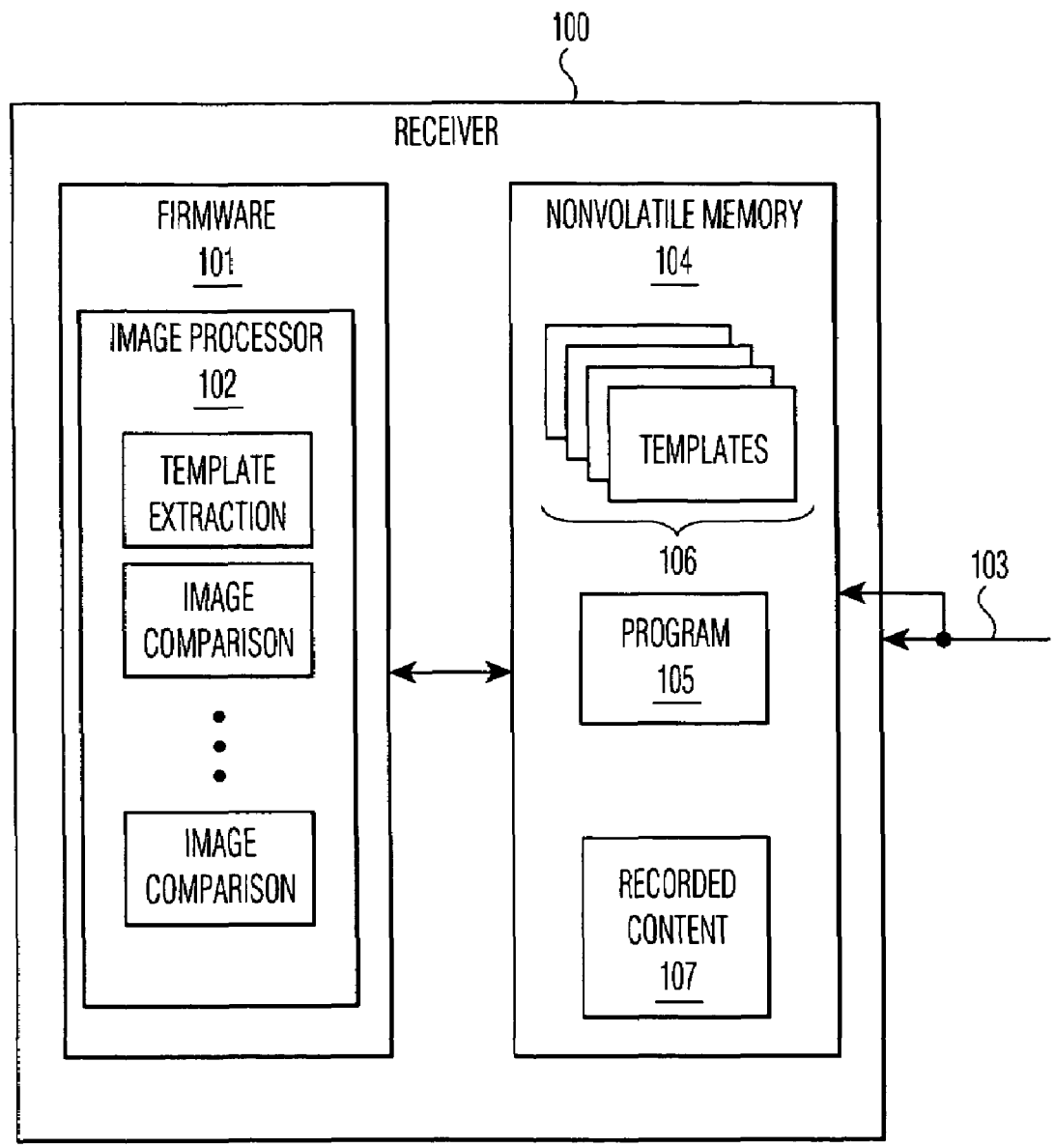
FIG. 1 depicts a video receiver including image detection and optional extraction according to one embodiment of the present invention.
Figure 2A:
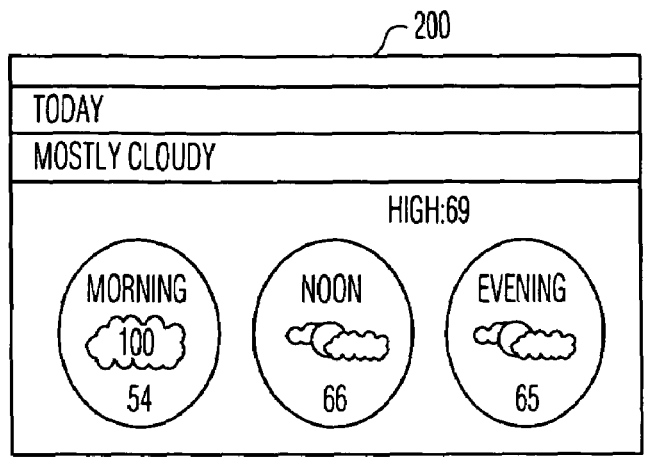
FIGS. 2A-2C are sample images and a corresponding template for use in video content-based control of video information recording according to one embodiment of the present invention.
Figure 2B:
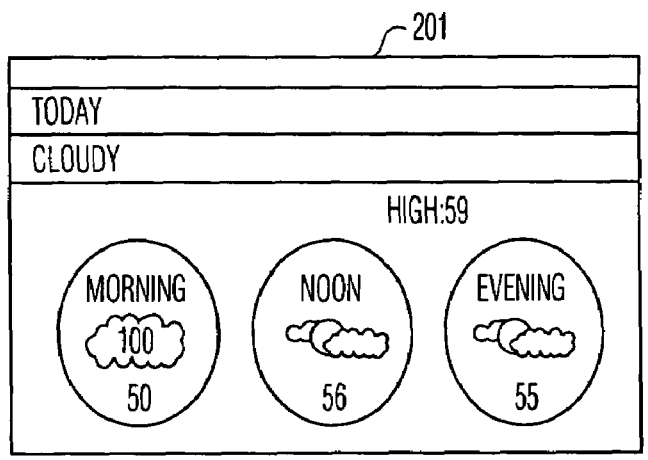
Figure 2C:
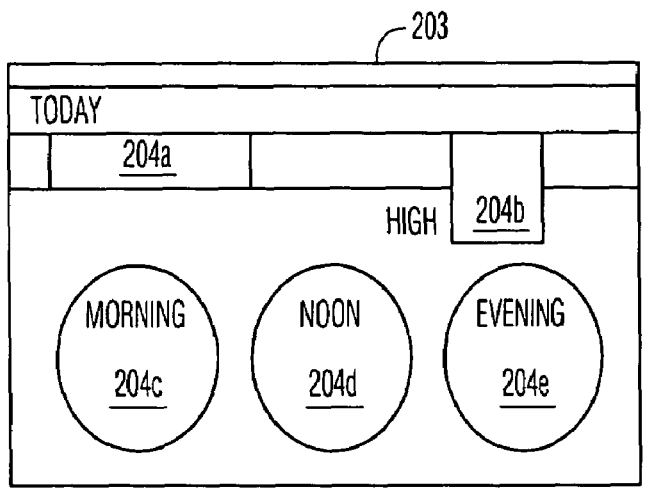
Figure 3:
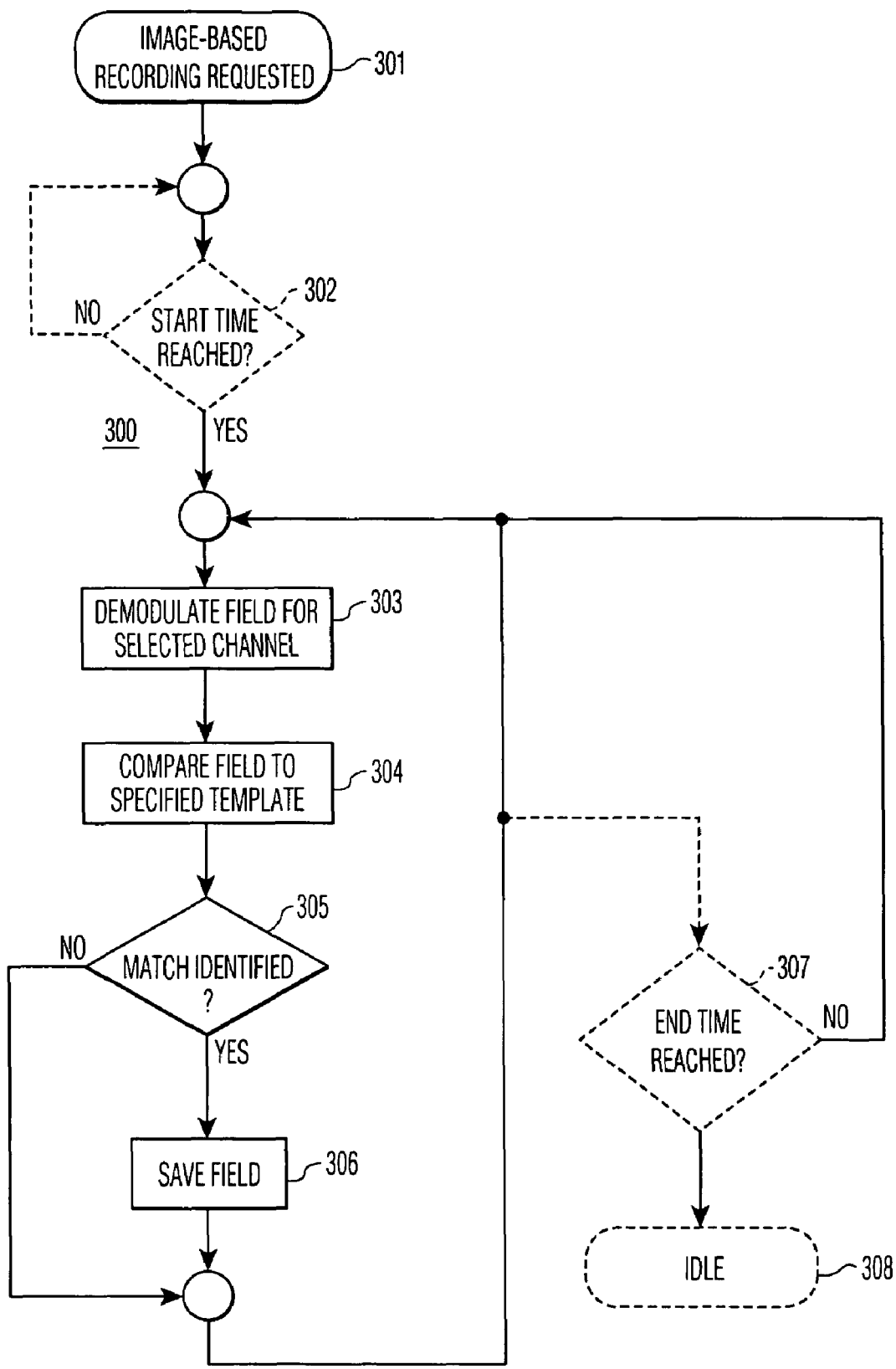
FIG. 3 is a high level flow chart for a process of image detection and/or extraction from a broadcast stream according to one embodiment of the present invention.

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device.

FIG. 1 depicts a block diagram for a video receiver including image detection and optional extraction according to one embodiment of the present invention. Video receiver 100 is a television, set-top box, or digital video cable, satellite or terrestrial broadcast receiver including a tuner (not shown) capable of demodulating received broadcast programming. Those skilled in the art will recognize that the entire construction and operation of a video receiver is not depicted or described herein. However, the present invention may be employed in conjunction with conventional video receivers, and only so much of the video receiver construction and operation as is necessary for an understanding of, or unique to, the present invention is depicted and described herein.

Video receiver 100 includes firmware 101, a combination of hardware and software defining operation and control of video receiver 100. In the present invention, firmware 101 includes an image processor 102 employed for content-based identification of content to be recorded. In particular, image processor 102 includes image comparison capabilities, preferably algorithms which can accurately identify images matches even if one of the images contains distortion in color or sharpness or is tilted or offset with respect to the other. Use of color histograms and spatial distribution of image features in image matching have been substantially explored, and algorithms providing excellent performance have been developed. Software video-processing programs having such capabilities are commercially available.

Receiver 100 in the exemplary embodiment also includes a connection 103 for receiving video information from the broadcast source and a nonvolatile memory 107 (e.g., a flash memory or a magnetic disk) contained within or coupled to video receiver 100. Nonvolatile memory 104 contains a program 105 executed by image processor 102 for identification of video content within the received video information matching one or more templates 106 specified by the user.

FIGS. 2A-2C are sample images and a corresponding template for use in video content-based control of video information recording according to one embodiment of the present invention. FIGS. 2A and 2B are sample video images for video information which the user wishes to record, a graphic for presenting weather conditions from a news weather forecast in this example. A user who is unable to watch the news program including the weather forecast, or who does not care to watch the entire forecast or fast-forward search through a recording of the entire news forecast, may nonetheless wish to view the weather forecast.

The images 200, 201 in FIGS. 2A and 2B are similar in most parts and may be employed to derive a corresponding image template 203. The white regions 204a-204e within image template 203 represent regions of variability where different information or content may appear, and are ignored during comparison with received video information for the purposes of identifying a match. Although depicted as rectangular in the exemplary embodiment, white spaces or regions such as those shown 204a-204e may be of any arbitrary shape.

Matches are identified by comparing the remainder of image template 203 (other than the white spaces) to a received video field or frame. When a predetermined degree of similarity is detected between a received field or frame and the image template, a match is considered to have been determined.

A particular image template 203 may be created from one or more captured images using a graphics program (not shown) or by image processor 102 running a template extraction process comparing two or more captured images to identify common characteristics. While viewing a program or programs, a user may designate frames within the program(s) for capture and use in deriving an image template.

Image templates 106, which are of the form shown by image template 203 in FIG. 2C, define the color characteristics and spatial distribution of regions which are compared for a degree of similarity. Although shown in the example of FIG. 2C as a full field image with relatively small white regions, image templates 106 may comprise only a small, specific portion of the field (i.e., a white region covers most of the field). For example, an image template may be defined to capture a bar across the bottom of the field providing a running "ticker" of sports scores, stock prices, or news highlights.

Image templates 106 may be created by the user or transmitted to video receiver 100 via an input connection 103 at which video information is received. That is, templates 106 may be generated remotely and transmitted to video receiver 100 utilizing the same broadcast medium (e.g., cable, satellite or terrestrial broadcast or Internet streaming) as the video programming to be demodulated and displayed, or via a different connection.

Most contemporary broadcast mediums includes hundreds of channels, rendering comparison of image templates 106 with all received content impractical. Accordingly, program 105 preferably includes, associated with each template 106, additional information for identifying the content to be recorded, such as channel, time period, program name or description, and/or closed-caption keywords. Such additional information is employed by image processor 102 to initially select received video information to which the corresponding template 106 is compared. Templates 106 provided from external sources may be bundled with such associated additional information, which may be used or modified by the viewer.

The additional information associated with a particular template 106 preferably includes the channel and program name(s) which include the content to be recorded, which may be captured from an electronic program guide. The additional information may also include a segment of or keywords from standard Advanced Television Systems Committee (ATSC) close-caption text from the relevant portion of the programming, or from the neighboring portion(s). For instance, in the example of FIGS. 2A through 2C, the terms "weather" and "forecast" may be employed for searching close-caption text. Where a user designates portions of one or more viewed programs for extracting image templates, post-processing of closet-caption text may be manual, with minimum user interface requirements, or automatic, by eliminating stop-words and finding an intersection of the close-caption texts for several examples.

The additional information associated with templates 108 are employed by program 105 to control timing and selection of channels or broadcast content which is demodulated by video receiver 100 for comparison with the corresponding template. Close-caption information may further narrow the portion of broadcast content which is compared to the corresponding template to a predetermined period following detection of keywords within the close-caption text.

As noted above, templates 106 may be created within video receiver 100, distributed to the subscriber through broadcast transmission or physical media (e.g., CD-ROM), or downloaded via the Internet from a variety of sources. For example, an advertiser may create templates allowing the user the capture commercials produced by that advertiser. Templates generated outside video receiver 100 are similar in the final content, but may be derived from larger training sets or carry embedded video "keys" or "water-marks" (unique image patterns for quick identification of matches), and are therefore more likely to have better accuracy.

Templates 106 and associated additional information (channel identification, close-caption keywords, etc.) received from outside video receiver 100, as well as those generated within video receiver 100, may be changed or deleted by the subscriber. Both the image templates 106 and the associated additional information may be altered by the subscriber.

Video receiver 100 preferably has sufficient resources (nonvolatile storage, processor, memory, etc.) to maintain a repository of templates 106 and to compare the templates to at least selected incoming broadcast content, then store matching images extracted from the received broadcast content. When video receiver 100 is idle, image processor 102 scans one or more designated channels; when video receiver 100 is active (being utilized to view broadcast content), image processor 102 scans at least the viewed channel. If tuning capabilities within video receiver 100 permit concurrent demodulation of multiple channels, image processor 102, image processor 102 may scan multiple channels concurrently utilizing separate image comparison processes.

If the nonvolatile memory 104 within video receiver 100 is a hard disk drive or other media having sufficient capacity, received broadcast programming containing matching images is stored within recorded content 107. Otherwise a connection (not shown) such as a universal serial bus (USB) port within video receiver 100 may allow matching content to be exported to an external device, such as a video cassette recorder, read-write digital versatile disk (R-W DVD) unit, or a personal computer.

Saved images or image sequences (with or without related audio and/or close-caption text) may be retrieved from recorded content 107 by the subscriber for viewing. Such images may also be employed as examples (both positive and negative) for forming templates. The user may also be permitted to manage the contents of the image repository 107, saving or deleting selected images as desired. Additionally, or in the alternative), automatic management functionality may be provided such that saved image(s) are retained until a new match is found for the corresponding template, or the N most recent images are retained, where N is a positive nonzero integer selected by the user.

In an alternative embodiment, the broadcast service provider may perform the image extraction for the subscriber at the broadcast server side, delivering the resulting matches to the video receiver 100 through the broadcast stream or other distribution connection such as the Internet.

FIG. 3 is a high level flow chart for a process of image detection and/or extraction from a broadcast stream according to one embodiment of the present invention. The process 300, which may be executed either within video receiver 100 or within a server transmitting broadcast programming to video receiver 100, begins with initiation of image-based selection of content to be recorded (step 301) by, for example, a user setting parameters for a recording program.

The process may pass first to an optional step of determining whether a selected start time has been reached (step 302). Image-based selection of content for recording may be used in conjunction conventional time-based selection of content for recording, or may alternatively be employed alone with one or more channels being continuously monitored.

After content-based selection of received broadcast programming for recording is initiated, the first field (or frame) received for the selected channel is demodulated (step 303) and compared to the corresponding template (step 304). If the similarity between the demodulated field and the template exceeds a predefined threshold, such that a match is identified (step 305), the demodulated field is saved or otherwise recorded for later retrieval and viewing by the user. The process then demodulates the next field for the selected channel, and the process (steps 303-306) is repeated. Multiple successive fields found to match the template, together with the associated audio and optionally close-caption text, may be stored as a video clip for later retrieval and viewing by the user as such.

If the ability to concurrently demodulate multiple channels is available, multiple instances of the process (steps 303-306) execute in parallel. Optionally, a determination may be made regarding whether a user-specified end time has been reached (step 307), and, if so, the process halted (step 308).

The present invention permits selection of content within broadcast programming based upon video content, in addition to or in lieu of conventional time and channel-based and/or peripheral text-based selection of content. Image templates for such video-based content selection may be derived from examples, and either generated by the user or by an external source transmitting the templates with the broadcast programming or via an alternative connection to the video receiver. Matching programming is stored for subsequent retrieval and viewing by the user. Specific portions of broadcast programming which the subscriber could not otherwise specifically select, such as subportions of a program (e.g., weather forecasts) or advertisements, may be identified within the received content and recorded.

It is important to note that while the present invention has been described in the context of a fully functional video receiver, those skilled in the art will appreciate that at least portions of the mechanism of the present invention is capable of being distributed in the form of a machine usable medium containing instructions in a variety of forms, and that the present invention applies equally regardless of the particular type of signal bearing medium utilized to actually carry out the distribution. Examples of machine usable mediums include: nonvolatile, hard-coded type mediums such as read only memories (ROMs) or erasable, electrically programmable read only memories (EEPROMs), recordable type mediums such as floppy disks, hard disk drives and compact disc read only memories (CD-ROMs) or digital versatile discs (DVDs), and transmission type mediums such as digital and analog communication links.

Although the present invention has been described in laid detail, those skilled in the art will understand that various changes, substitutions, variations, enhancements, nuances, gradations, lesser forms, alterations, revisions, improvements and knock-offs of the invention disclosed herein may be made without departing from the spirit and scope of the invention in its broadest form.

What is claimed is:

1. A system for video content-based selection of programming for recording comprising:
 a connection for receiving broadcast programming; and
 an image processor comparing a demodulated field from the received broadcast programming to a template defining characteristics of video content desired to be recorded and saving the field in response to determining at least a threshold level of similarity between the field and the template.

2. The system as set forth in claim 1 wherein the template defines color characteristics and spatial distribution of regions to be compared to the demodulated field for determining a level of similarity.

3. The system as set forth in claim 2 wherein the template includes white regions of expected variability which are ignored in comparing the template to the demodulated field.

4. The system as set forth in claim 1 wherein the image processor continuously compares demodulated fields for a selected channel to the template.

5. The system as set forth in claim 1 wherein the image processor compares demodulated fields for a selected channel to the template during a predefined period.

6. The system as set forth in claim 1 wherein the image processor compares successive demodulated fields to the template and saves all demodulated fields having at least the threshold level of similarity with the template together with associated audio.

7. The system as set forth in claim 1 wherein the image processor compares demodulated fields for a plurality of channels each to a designated template from one or more templates.

8. A video receiver comprising:
   a connection for receiving broadcast programming;
   a tuner demodulating fields from the received broadcast programming;
   nonvolatile storage containing one or more templates defining characteristics of video content desired to be recorded; and
   an image processor comparing a demodulated field to a template and saving the field in response to determining at least a threshold level of similarity between the field and the template.

9. The video receiver as set forth in claim 8 wherein the template defines color characteristics and spatial distribution of regions to be compared to the demodulated field for determining a level of similarity.

10. The video receiver as set forth in claim 9 wherein the template includes white regions of expected variability which are ignored in comparing the template to the demodulated field.

11. The video receiver as set forth in claim 8 wherein the image processor continuously compares demodulated fields for a selected channel to the template.

12. The video receiver as set forth in claim 8 wherein the image processor compares demodulated fields for a selected channel to the template during a predefined period.

13. The video receiver as set forth in claim 8 wherein the image processor compares successive demodulated fields to the template and saves all demodulated fields having at least the threshold level of similarity with the template together with associated audio.

14. The video receiver as set forth in claim 8 wherein the image processor compares demodulated fields for a plurality of channels each to a designated template from one or more templates.

15. A method of video content-based selection of programming for recording comprising:
   obtaining a field from broadcast programming;
   comparing the field from the broadcast programming to a template defining characteristics of video content desired to be recorded; and
   saving the field in response to determining at least a threshold level of similarity between the field and the template.

16. The method as set forth in claim 15 wherein the step of comparing the field from the broadcast programming to a template defining characteristics of video content desired to be recorded further comprises:
   comparing the field to a template defining color characteristics and spatial distribution of regions to be compared to the demodulated field for determining a level of similarity.

17. The method as set forth in claim 16 wherein the step of comparing the field from the broadcast programming to a template defining characteristics of video content desired to be recorded further comprises:
   comparing the field to a template including white regions of expected variability which are ignored in comparing the template to the demodulated field.

18. The method as set forth in claim 15 wherein the step of comparing the field from the broadcast programming to a template defining characteristics of video content desired to be recorded further comprises:
   continuously comparing fields for a selected channel to the template.

19. The method as set forth in claim 15 wherein the step of comparing the field from the broadcast programming to a template defining characteristics of video content desired to be recorded further comprises:
   comparing fields for a selected channel to the template during a predefined period.

20. The method as set forth in claim 15 wherein the step of comparing the field from the broadcast programming to a template defining characteristics of video content desired to be recorded further comprises:
   comparing successive fields to the template and saves all fields having at least the threshold level of similarity with the template together with associated audio.

21. The method as set forth in claim 15 wherein the step of comparing the field from the broadcast programming to a template defining characteristics of video content desired to be recorded further comprises:
   comparing fields for a plurality of channels each to a designated template from one or more templates.

* * * * *